US009418219B2

(12) United States Patent
Bathula et al.

(10) Patent No.: US 9,418,219 B2
(45) Date of Patent: Aug. 16, 2016

(54) INTER-PROCESS MESSAGE SECURITY

(75) Inventors: Avinashreddy Bathula, Kirkland, WA (US); Jimmy Alexander, Bellevue, WA (US); Keith C. Bentley, Redmond, WA (US); Neil L. Coles, Redmond, WA (US); Brian Hudson, Kirkland, WA (US); Matthew G. Lyons, Duvall, WA (US); John Mark Miller, Kirkland, WA (US); Andrew M. Rogers, Bellevue, WA (US); Upender R. Sandadi, Issaquah, WA (US); Scott R. Shell, Kirkland, WA (US); Jon Vincent, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2034 days.

(21) Appl. No.: 12/101,243

(22) Filed: Apr. 11, 2008

(65) Prior Publication Data

US 2009/0260052 A1 Oct. 15, 2009

(51) Int. Cl.

| | | |
|---|---|---|
| *G06F 17/00* | (2006.01) | |
| *G06F 21/53* | (2013.01) | |
| *G06F 21/55* | (2013.01) | |
| *G06F 9/46* | (2006.01) | |
| *G06F 21/54* | (2013.01) | |
| *G06F 21/52* | (2013.01) | |

(52) U.S. Cl.
CPC .............. *G06F 21/53* (2013.01); *G06F 21/556* (2013.01); *G06F 9/468* (2013.01); *G06F 21/52* (2013.01); *G06F 21/54* (2013.01)

(58) Field of Classification Search
CPC .......... G06F 21/52; G06F 9/468; G06F 21/54
USPC .................................................. 726/1
See application file for complete search history.

(56) References Cited

U.S. PATENT DOCUMENTS

| | | | |
|---|---|---|---|
| 7,200,865 B1 | 4/2007 | Roscoe et al. .................. 726/12 |
| 2003/0115487 A1* | 6/2003 | Andrews et al. ............... 713/201 |
| 2003/0172109 A1* | 9/2003 | Dalton et al. ................. 709/203 |
| 2004/0143751 A1 | 7/2004 | Peikari ........................... 713/200 |
| 2004/0250107 A1 | 12/2004 | Guo ............................... 713/200 |
| 2005/0005165 A1 | 1/2005 | Morgan et al. ................ 713/201 |

(Continued)

OTHER PUBLICATIONS

"Running Vista Every Day!", Feb. 4, 2007, invisiblethings, htip://theinvisiblethings.blogspot.com/2007/02/running-vista-every-day. html, 13 pgs.

(Continued)

*Primary Examiner* — Krista Zele
*Assistant Examiner* — James Forman
(74) *Attorney, Agent, or Firm* — Judy Yee; Micky Minhas (57) ABSTRACT

An inter-process messaging security management may be provided. A message comprising an operation to be performed may be sent from a process operating in a process chamber to a second process operating in another chamber. Before the message is allowed to be delivered, the validity of the operation contained in the message may be verified and a security policy may be examined to determine whether the message is permitted to be sent from the first process to the second process. If the security policy permits the second process to execute the operation requested by the first process, the message may be delivered to the second process. If the operation is not permitted, the message may not be delivered and an error message may be returned to the first process.

20 Claims, 7 Drawing Sheets

(56) References Cited

U.S. PATENT DOCUMENTS

| | | | |
|---|---|---|---|
| 2005/0071855 A1 | 3/2005 | Mathur et al. | 719/328 |
| 2005/0120242 A1* | 6/2005 | Mayer et al. | 713/201 |
| 2005/0149726 A1* | 7/2005 | Joshi et al. | 713/164 |
| 2005/0193391 A1 | 9/2005 | Demsey et al. | 719/313 |
| 2006/0075383 A1* | 4/2006 | Moorthy et al. | 717/106 |
| 2006/0075478 A1 | 4/2006 | Hyndman et al. | 726/11 |
| 2006/0248585 A1* | 11/2006 | Ward et al. | 726/20 |
| 2006/0277311 A1* | 12/2006 | Franco et al. | 709/229 |
| 2007/0101148 A1 | 5/2007 | Schutz et al. | 713/182 |
| 2007/0118901 A1* | 5/2007 | Focke et al. | 726/22 |
| 2008/0022405 A1* | 1/2008 | Wang et al. | 726/23 |
| 2008/0313417 A1* | 12/2008 | Kim et al. | 711/163 |

OTHER PUBLICATIONS

"Vishal's Windows Application Compatibility Awareness," Nov. 30, 2006, http://blogs.msdn.com/vishalsi/archive/2006/11/30/what-is-user-interface-privilege-isolation-uipi-on-vista.aspx, 2 pgs.

"Windows Integrity Mechanism Design,", 2008, http://msdn2.microsoft.com/en-us/library/bb625963(printer).aspx, 16 pgs.

"User Interface Privilege Isolation," Dec. 25, 2007, http://en.wikipedia.org/wiki/User_Interface_Privilege_Isolation, 1 pg.

Spencer Shimko et al., "Securing Inter-Process Communication in Selinux," Tresys Technology, Mar. 12, 2007, 10 pgs.

\* cited by examiner

INTER-PROCESS MESSAGE SECURITY

BACKGROUND

Software applications can be subject to computer security breaches using improper or unauthorized control messages from another application. For example, shatter attacks occur when a lower privileged application sends a control message to a higher privileged application. The control message causes the higher privileged application to perform an unsafe task that the lower privileged application could not have performed on its own. Such unsafe tasks include hiding application interfaces, enabling or disabling functionality within an application, or accessing data corresponding to unrelated applications. This can be caused by the higher privileged application failing to perform sufficient validation on arguments passed in the control message.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Inter-process message security may be provided. A message may be received from a first process associated with a first process chamber. A destination process and associated second process chamber may be determined for the message. A security policy may then be determined to permit interaction between the first and second process chambers. In response to determining that a security policy may permit interaction between the first and second process chambers, the message may be sent to the destination process.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Inter-process message security may be provided. Consistent with embodiments of the present invention, a first software application may send a message to a second software application. This message may, for example, comprise a request to perform an operation. For example, the message may send information, request data, or provide instructions to perform a further operation. In order to ensure that the second software application is protected from being manipulated or accessed improperly, a security policy may be consulted to determine if the first software application and the second software application are allowed to communicate such a message.

Figure 1:
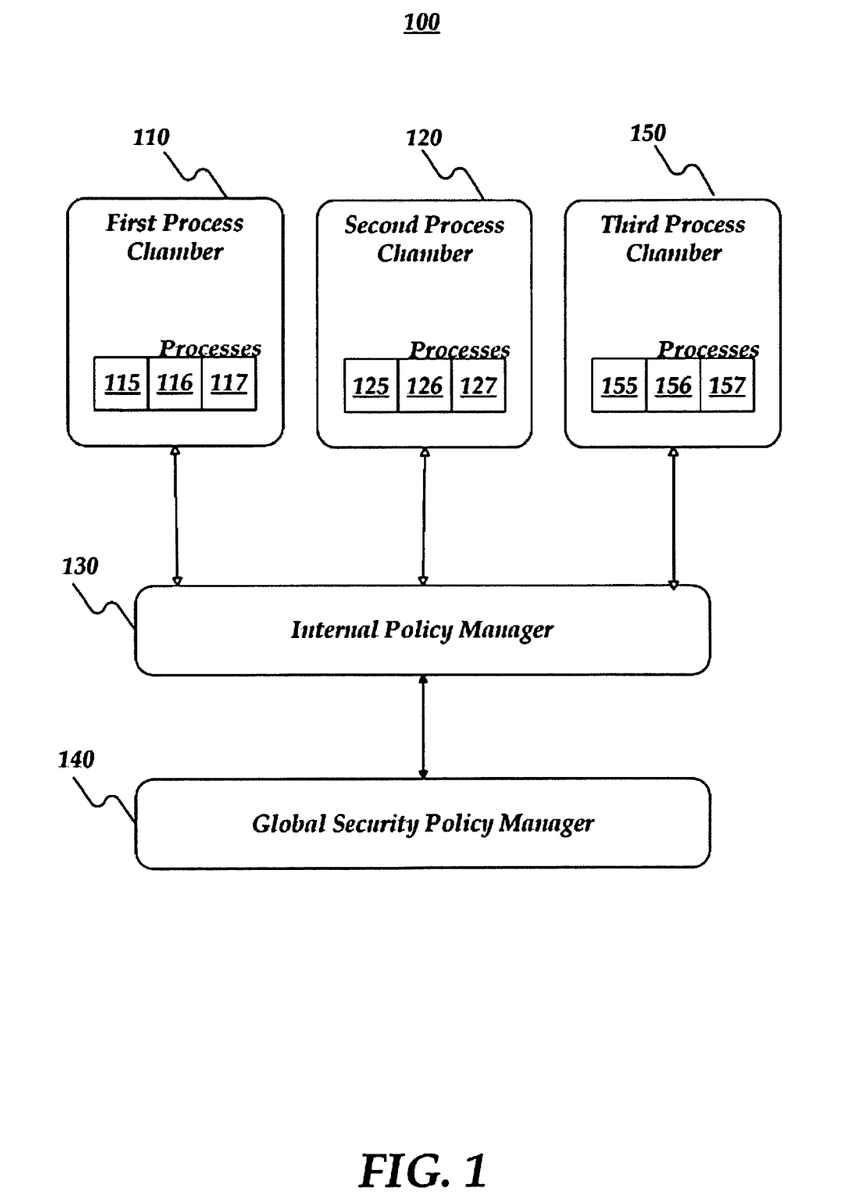
FIG. 1 is a diagram showing multiple process chambers in an inter-process message security system.

FIG. 1 is a diagram showing multiple process chambers in an inter-process message security system 100. System 100 includes a first process chamber 110, a second process chamber 120, a third process chamber 150, an internal policy manager 130, and a global security policy manager 140. First process chamber 110 may include a plurality of processes 115, 116, and 117, second process chamber 120 may include a plurality of processes 125, 126, and 127, and third process chamber 150 may include a plurality of processes 155, 156, and 157. Each process 115, 116, 117, 125, 126, 127, 155, 156, and 157 may have multiple properties.

Figure 2:
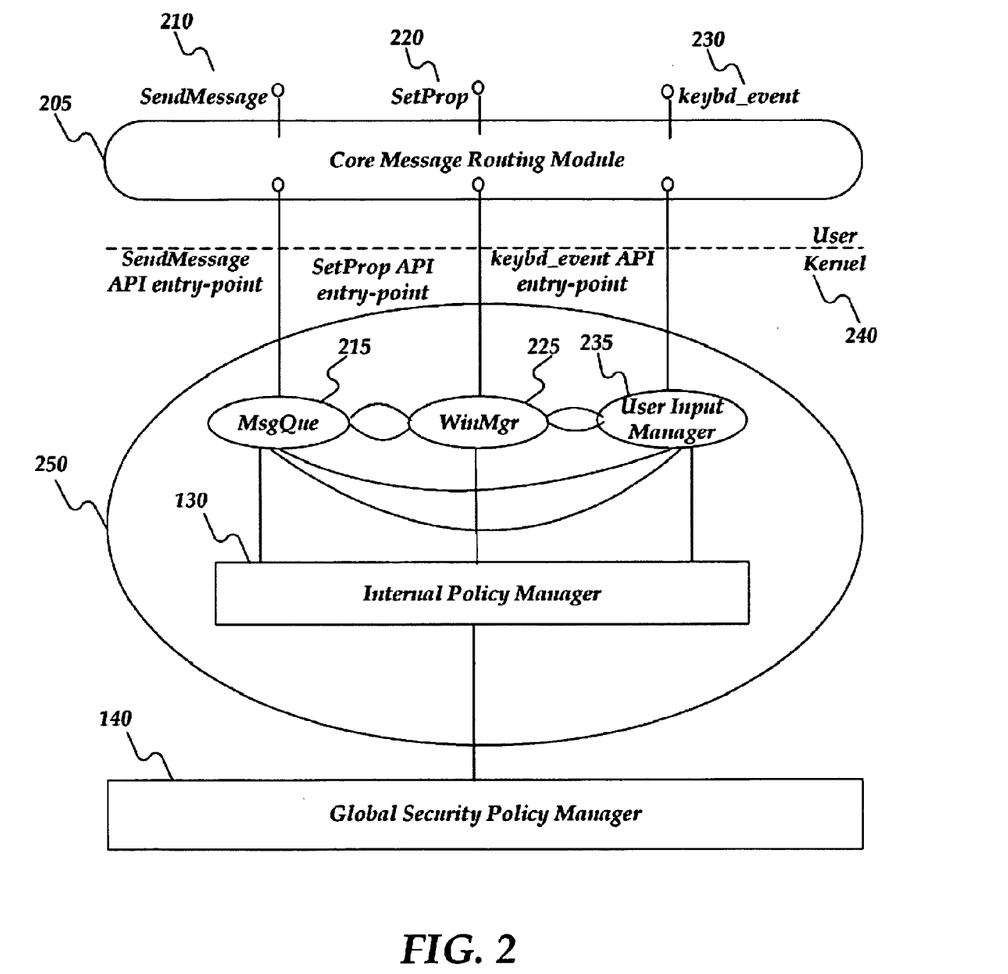
FIG. 2 is a diagram showing an inter-process message security system.

FIG. 2 is a diagram showing inter-process message security system 100 in more detail. System 100 may include multiple application programming interfaces (APIs) to processes. For example, system 100 may include a SendMessage API 210, a SetProp API 220, and a keybd_event API 230. System 100 may further include a core message routing module 205 and an operating system kernel 240. Operating system kernel 240 may include a message subsystem 250 and global security policy manager 140. Message subsystem 250 may include function servers such as a message queue server 215, a window manager server 225, and a user input manager 235. Message subsystem 250 may further include internal policy manager 130.

Figure 3A:
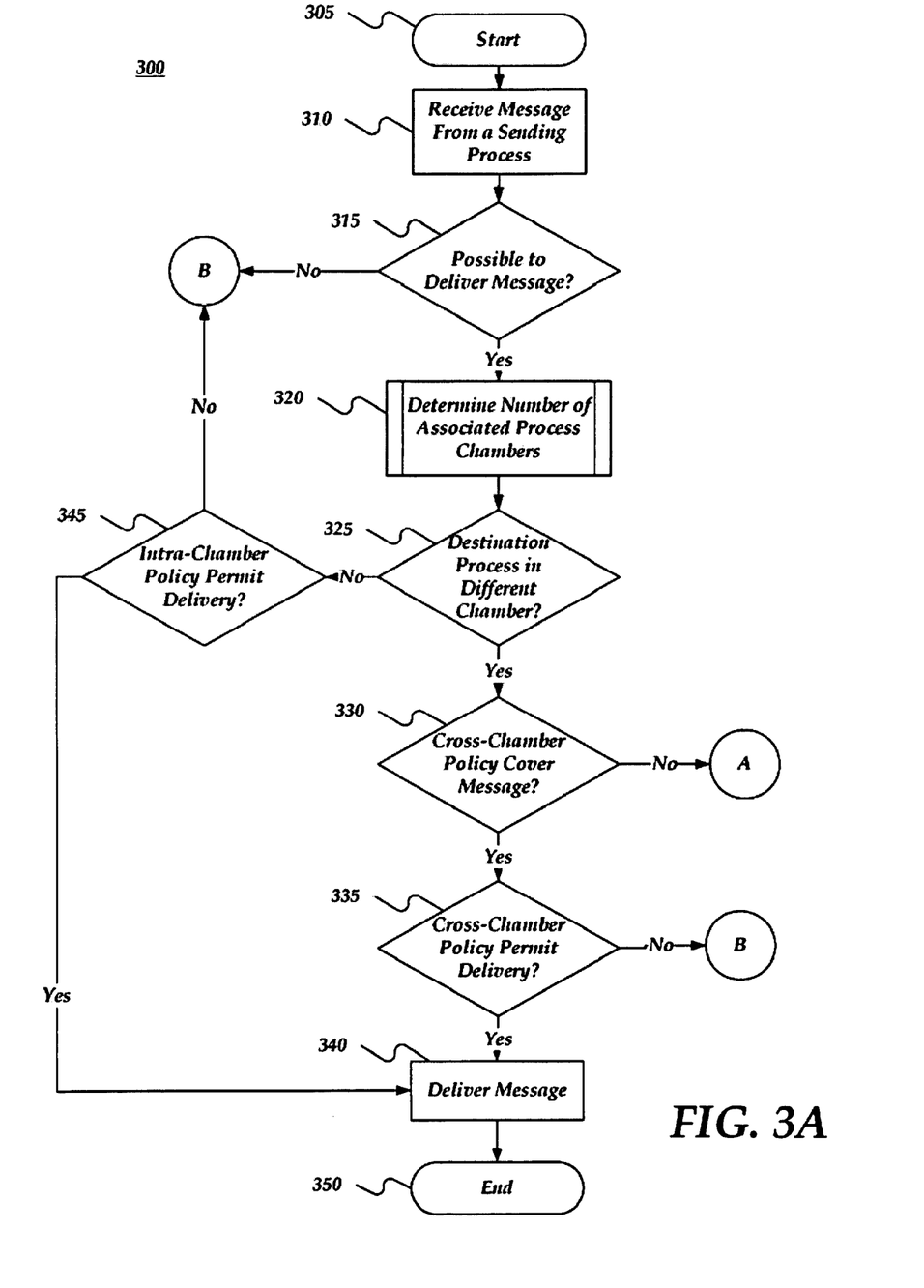
FIG. 3A is a flow chart of a method for providing inter-process message security.
Figure 3B:
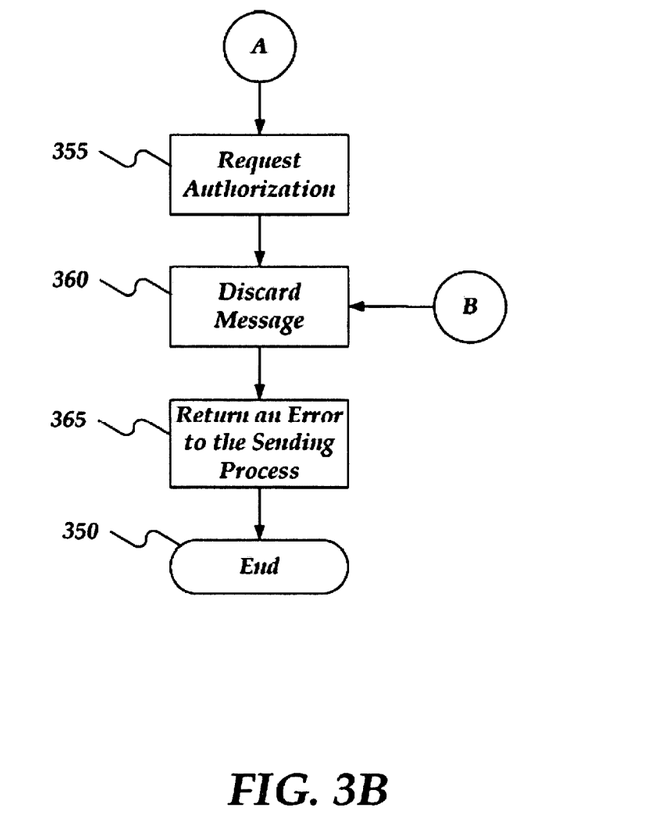
FIG. 3B is a continuation of the flow chart depicted in FIG. 3A.

FIGS. 3A and 3B are flow charts setting forth the general stages involved in a method 300 consistent with embodiments of the invention for providing inter-process message security. Method 300 may be implemented using a computing device 600 as described in more detail below with respect to FIG. 6. Computing device 600 may provide an operating environment for system 100. Ways to implement the stages of method 300 will be described in greater detail below.

Figure 5:
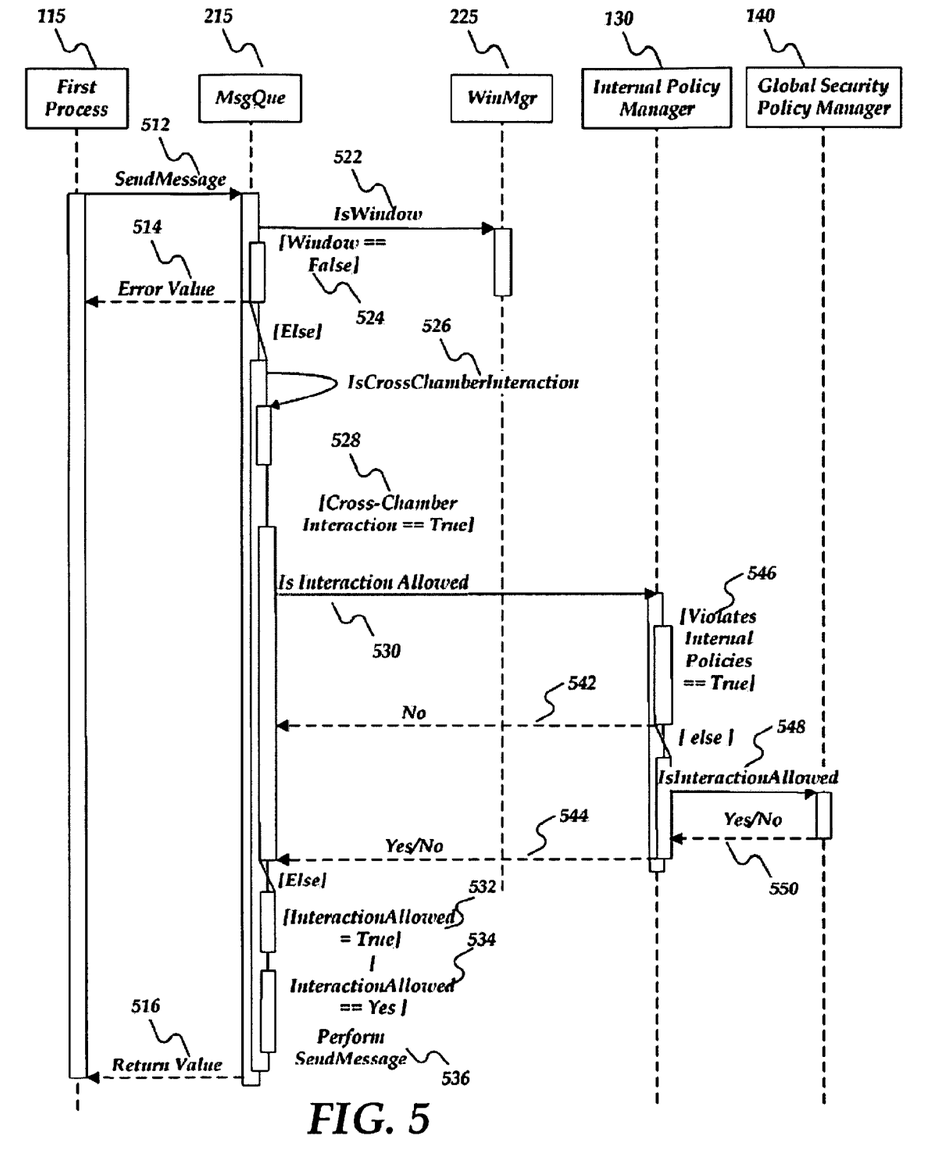
FIG. 5 is a state diagram of the method for providing inter-process message security.

FIG. 5 shows a state diagram to further illustrate method 300. Consistent with embodiments of the invention, first process 115 may send a message via an API. (State 512.) Core message routing module 205 may route the message to message queuing subsystem 215 that may communicate with a window manager subsystem 225. Consistent with embodiments of the invention, the received message may comprise an operation request requiring interaction with another process in process chamber 110 such as process 116. Such operation requests may comprise a request to deliver a message, to set or retrieve data, or to create or service a user input request.

Method 300 may begin at starting block 305 and proceed to stage 310 where computing device 600 may receive a message from first process 115 associated with first process chamber 110. For example, first process 115 may comprise a user process such as a software application that requests interaction with a second process via an API such as SendMessage API 210, SetProp 220, or keybd_event 230. Interaction requests may be formatted as a message that may be passed to core message routing module 205 by a call to one of the APIs (e.g. SendMessage API 210, SetProp 220, or keybd_event 230).

Consistent with embodiments of the invention, first process 115 may attempt to send a message to second process 116 that may also operate in first process chamber 110. For example, first process 115 may comprise a banking software application that may be permitted to send a message to second process 116 that may comprise a checking account history software application also operating in first process chamber 110 in order to query an account balance.

First process 115 in first process chamber 110 may attempt to send a message to second process 125 in second process chamber 120. Internal policy manager 130 may route the message to global security policy manager 140 to determine whether at least one security policy permits interaction between first process chamber 110 and second process chamber 120. For example, first process chamber 110 and second process chamber 120 may represent a logical division between first process 115 and second process 125. The logical division between first process 115 and second process 125 may further represent a security boundary.

Core message routing module 205 may route an API call to message subsystem 250. Message subsystem 250 may include function servers for implementing the functionality provided by the APIs. For example, SendMessage API 210 may provide a software application with functionality to send a message to a second software application, SetProp API 220 may be provided to set a data value in the second software application, and keybd_event API 230 may be provided to send a keystroke. Other APIs may be provided, for example, to send other user input information such as mouse movements or selections. Core message routing module 205 may route calls to SendMessage API 210 to message queue server 215. Calls to SetProp API 220 may be routed to window manager server 225, and calls to keybd_event API 230 may be routed to user input manager 235.

Each function server may communicate with each other function server in order to complete a requested interaction. For example, a call to SendMessage API 210 may be routed to message queue server 215 that may in turn call user input management server 235 to process input that may be associated with the original call to SendMessage API 210.

From stage 310, method 300 may advance to stage 315, where computing device 600 may determine if it is possible to deliver the message. For example, second process 125 may not be a valid window, as determined by a call to window manager 225 of messaging subsystem 250. (State 522.) Consistent with embodiments of the invention, windows may be UI resources belonging to processes to whom messages can be sent. Every window may be associated with a unique window handle. For example, process 115 of process chamber 110 may try and send a window message to a window handle associated with a window belonging to process 125 of process chamber 120. In stage 315, method 300 may check with window-manager 225 if the window handle provided is a valid one or not. A message may also be of a type that is not logically able to be delivered to second process 125, such as a window creation request message or an initialize dialog box message. If the message is not able to be delivered, method 300 may advance to stage 360 where computing device 600 may discard the message. (State 524.) Consistent with embodiments of the invention, method 300 may then advance to stage 365 where computing device 600 may return an error to first process 115. (State 514.) Method 300 may then end at stage 350.

If the message is determined to be of a type that can logically be performed, method 300 may advance from stage 315 to subroutine 320 where computing device 600 may determine the number of process chambers associated with a message. Subroutine 320 is discussed below in greater detail with respect to FIG. 4.

Method 300 may then advance to stage 325 where computing device 600 may determine whether second process 125 is associated with second process chamber 120. (State 526.) For example, first process 115 may be associated with first process chamber 110 and second process 125 may be associated with second process chamber 120. Consistent with embodiments of the invention, processes may comprise at least one of a game application, a financial application, an electronic document processing application, a productivity application, an internet access application, a personal information management application, an interface management process, a user management process, a server process, and an operating system process. The aforementioned are merely examples, and other processes may be used.

If computing device 600 determines that second process 125 is associated with second process chamber 120, method 300 may advance to stage 330, where computing device 600 may determine whether any cross-chamber security policies are violated by the interaction request. (State 530.) Internal policy manager 130 may maintain a plurality of internal security policies with respect to process interaction permissions. For example, internal policy manager 130 may maintain an internal security policy permitting any message sent from first process 115 to itself to bypass further security checks. Another internal security policy may, for example, permit certain functionality when the interaction request requires a message to be sent between first process 115 and second process 116 both operating within first process chamber 110. Yet another internal security policy may, for example, deny delivery of the message when the requested interaction is logically impossible or first process 115 calling the API lacks privileges permitting the calling process to accomplish the requested functionality.

If no internal messaging policies are violated by the request, computing device 600 may query global security policy manager 140 to determine whether at least one security policy is associated with interactions between first process chamber 110 and second process chamber 120. (State 548.) For example, global security policy manager 140 may determine whether any security policy has been provided for sending a message of a particular type between first process chamber 110 and second process chamber 120.

Security policies may be maintained by global security policy manager 140 and may determine whether a security policy is provided for the given message based on data associated with the message. Global security policy manager 140 may maintain a plurality of security policies with respect to interactions between processes. For example, a security policy may permit all interactions between first process chamber 110 and second process chamber 120 while another security policy may permit first process chamber 110 limited or no interaction with third process chamber 150. For another example, a security policy may permit first process chamber 110 only to send data to second process chamber 120, but not to request data from second process chamber 120. The policies maintained by global security policy manager 140 may, for example, comprise policies established by operating system kernel 240, configured by a system administrator, and/or configured by a user. Consistent with embodiments of the invention, an administrator may also be a user. The administrator may have additional privileges to establish and/or configure interactions than a user.

If computing device 600 determines at least one security policy is associated with interactions between first process chamber 110 and second process chamber 120, method 300 may advance to stage 335, where computing device 600 may determine whether the at least one security policy associated with interactions between first process chamber 110 and second process chamber 120 permits the message to be sent from first process chamber 110 to second process chamber 120. (State 550.) The determination whether or not to allow the message to be delivered may then be returned to message subsystem 250 for further processing. (State 544.) For example, global security policy manager 140 may determine that a valid policy exists to allow first process 115 comprising a game application in first application chamber 110 to request data from destination process 125 comprising a banking application in second process chamber 120.

If computing device 600 determines that the at least one security policy associated with the first and second process chambers permits the message to be sent from first process chamber 110 to second process chamber 120, method 300 may advance to stage 340, where computing device 600 may deliver the message to second process 125. For example, a data request from first process 115 comprising a game application may be delivered to second process 125 comprising a banking application.

Global security policy manager 140 may inform internal policy manager 130 or message subsystem 250 whether or not the requested interaction is permitted. A function server such as message queue 215 may then be informed whether or not to proceed with the requested interaction. If the interaction is permitted, the function server may return a value to first process 115 indicating success. If the interaction is not permitted, the function server may return an error to first process 115.

At stage 325, computing device 600 may determine that first process 115 is attempting to send a message to second process 116 that may also operate in first process chamber 110. Method 300 may then advance to stage 345, where computing device 600 may determine whether an intra-chamber security policy is associated with intra-chamber messages. For example, first process 115 may comprise a banking application that sends a data request to destination process 116 comprising a related checking account history application. Because both applications may operate within the logical boundaries of first application chamber 110, global security policy manager 140 may not need to be called if internal policy manager 130 already permits such intra-chamber interactions. (State 532.) Consistent with embodiments of the invention, internal policy manager 130 may determine if an intra-process message is allowed under an internal policy list. For example, internal policy manager 140 may not permit first process 115 to send messages requesting a particular operation to any other process, regardless of the process chamber associated with the destination process. These message types may include, for example, messages that are logically impossible to be performed by another process.

If, at stage 345, computing device 600 determines that a policy exists with respect to the intra-chamber message, computing device 600 may determine whether the policy allows the intra-chamber message to be delivered. (State 532.) If the message is permitted, method 300 may advance to stage 340 where computing device 600 may send the message to second process 116. (State 532, State 534, and State 536.) Consistent with embodiments of the invention, computing device 600 may return a value indicating successful delivery to first process 115. (State 516.)

If, at stage 345, computing device 600 determines that no policy exists or no policy permits the message to be delivered, method 300 may advance to stage 360 where computing device 600 may discard the message. Method 300 may then advance from stage 360 to stage 365, where computing device 600 may return an error to first process 115. (State 514.)

After the message is either delivered at stage 340 or discarded at stage 360, and whether or not a return value or error is returned to the first process, method 300 may then end at stage 350. For example, first process 115 in first process chamber 110 may comprise a game application and second process 125 in second process chamber 120 may comprise a banking application. Game application 115 may attempt to send a message requesting data from banking application 125. The message may be routed to internal policy manager 130, that may not maintain a policy with respect to interactions between first process chamber 110 containing game application 115 and second process chamber 120 containing banking application 125. Global security policy manager 140 may then determine if a policy is in place to control data requests between first process chamber 110 and second process chamber 120. If a policy is in place that permits the interaction, global security policy manager 140 may allow the data request to be delivered to second process chamber 120 and routed to banking application 125. A value may be returned to game application 115. The value returned to game application 115 may comprise a value indicating that the message was successfully delivered.

Consistent with embodiments of the invention, maintaining the policies used by the internal policy manager and the global security policy manager may comprise creation, updating, modification, enabling, disabling, and removal. Maintaining the policies may be performed by at least one of a user, an administrator, a software application or process, and an operating system.

Figure 4:
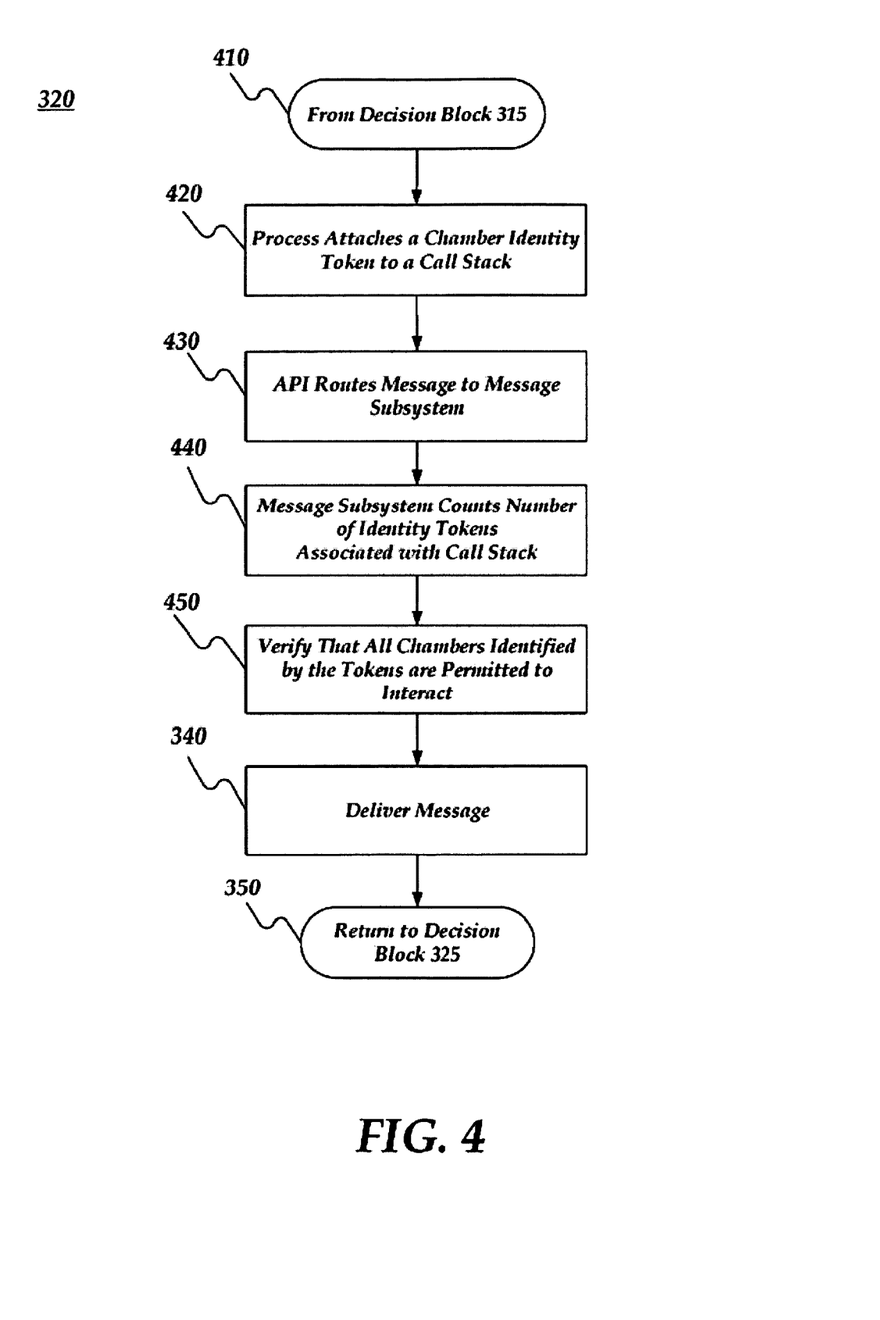
FIG. 4 is a flow chart of a subroutine used in the flow chart of FIG. 3A when a message is relayed through an intermediate process.

FIG. 4 is a flow chart of subroutine 320 used in the flow chart of FIG. 3A when an interaction requested by a message requires additional messages to be sent to additional processes. Subroutine 320 may begin at starting block 410 and proceed to stage 420 where computing device 600 may ensure that each process that sends a message associated with the interaction request associates a chamber identity token with a call stack. Each process may have a process identity token unrelated to the chamber identity token. The process identity token may be used to provide similar functionality to the chamber identity token. A plurality of processes may share an identity token that may be common to some or all processes operating within the same chamber. Each process may comprise a unique identity token and operate in a unique process chamber.

From stage 420, subroutine 320 may advance to stage 430, where computing device 600 may route the message to message subsystem 250. From stage 430, method 400 may advance to stage 440, where computing device 600 may cause message subsystem 250 to count the number of identity tokens associated with the call stack. For example, a message may have been sent from first process 115 in first process chamber 110 to second process 125 in second process chamber 120. To complete the interaction requested by first process 115, second process 125 may send a message to third process 155 in third process chamber 150. When second process 125 sends the message to third process 155, identity tokens associated with both first process chamber 110 and second process chamber 120 may be associated with the call stack.

From stage 440, subroutine 320 may advance to stage 450, where computing device 600 may determine that each chamber or process identified by the identity tokens associated with the call stack are permitted to send the message to the destination process. For example, computing device 600 may determine whether both first process chamber 110 and second process chamber 120 are permitted to send a message to third process chamber 150 prior to permitting the message to be delivered to third process 155. This determination may be made according to the stages described above with respect to FIG. 3.

From stage 450, subroutine 320 may advance to stage 340, where computing device 600 may deliver the message if each process or chamber identified by the identity tokens associated with the message is permitted to send the message to the destination process. Method 400 may then end at stage 350.

For example, first process 115 may call process 155 associated with process chamber 150, to request an operation. In order to accomplish the requested operation, process 155 may send a message to a window belonging to process 125 associated with process chamber 120. Identity tokens associated with process chamber 110 and process chamber 150 may both be associated with the call stack prior to sending the message to the window belonging to process 125. The message may be delivered if process chamber 110 and process chamber 150 are both permitted to interact with process chamber 120.

Embodiments consistent with the invention may comprise a system for providing inter-process message security. The system may comprise a memory storage and a processing unit coupled to the memory storage. The processing unit may be operative to receive a message from a process operating on the system, determine the logical chambers for the sending and destination process, and determine whether a security policy permits the sending of the message. The system may be further operative to deliver or discard the message in accordance with the security policy.

In embodiments consistent with the invention, components and functionality of system 100 may be provided by dynamically linked libraries (DLLs). For example, a core message routing module 205, a message subsystem 250, an internal policy manager 130, and a global security policy manager 140 may be provided by at least one DLL.

Figure 6:
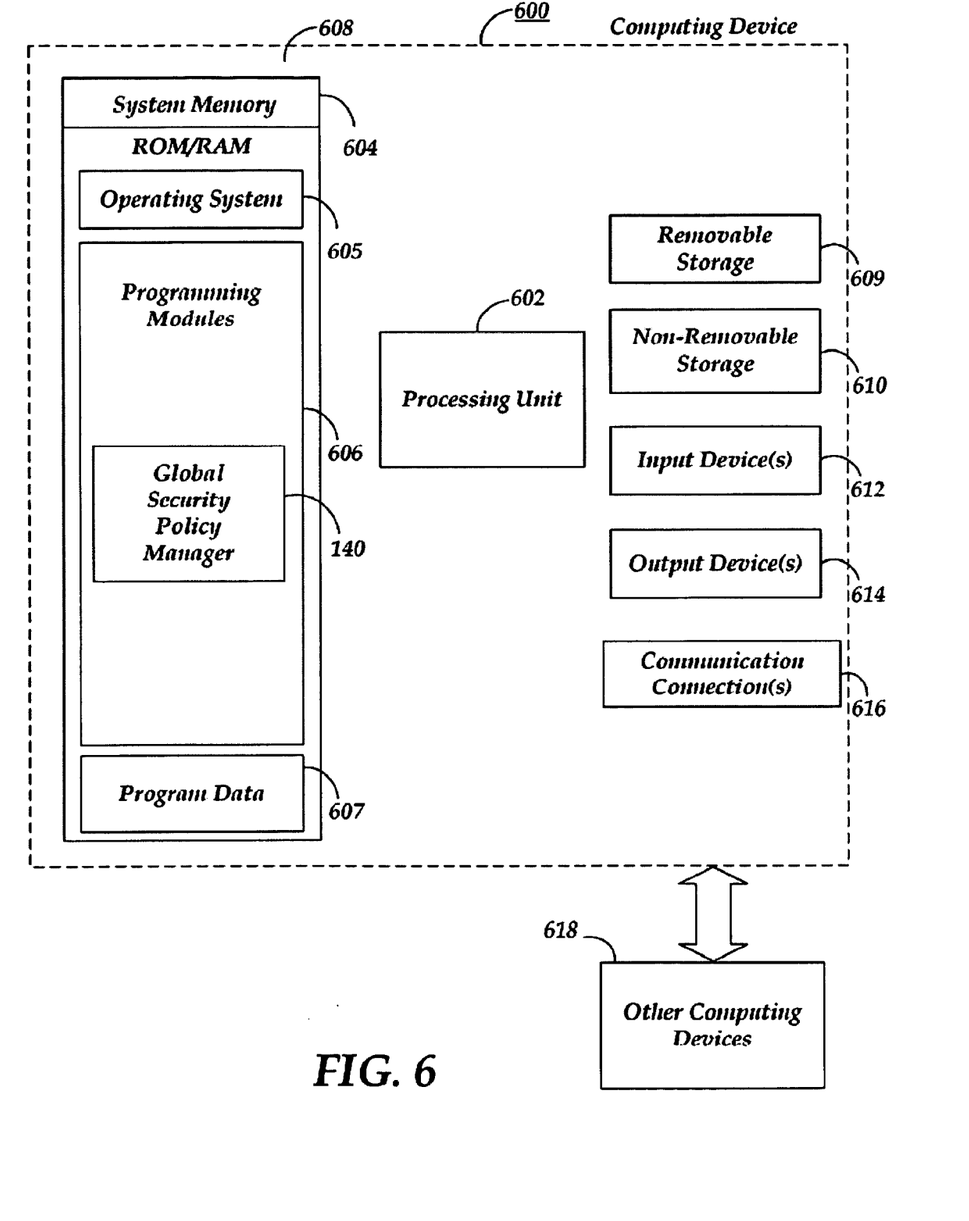
FIG. 6 is a block diagram of a system including a computing device.

FIG. 6 is a block diagram of a system including computing device 600. Consistent with embodiments of the invention, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the invention. Furthermore, computing device 600 may comprise an operating environment for system 100 as described above. System 100 may operate in other environments and is not limited to computing device 600.

With reference to FIG. 6, a system consistent with embodiments of the invention may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include libraries comprising data for providing a global security policy manager 620. Consistent with embodiments of the invention, an operating system 605 may include an internal policy manager 130 and a global security policy manager 140. Furthermore, embodiments of the invention may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g. global security policy manager 140) may perform processes including, for example, one or more of method 300's stages. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing inter-process messaging security, the method comprising:
   receiving a message from a first process associated with a first set of processes governed by a first set of security policies, the message comprising a request to perform an operation by a destination application;
   determining a destination process for the message;
   determining whether the destination process is associated with a second set of processes governed by a second set of security policies;
   in response to determining that the destination process is associated with the second set of processes, determining whether at least one security policy permits interaction between the first set of processes and the second set of processes;
   in response to determining that the at least one security policy permits interaction between the first set of processes and the second set of processes, sending the message to the destination process, wherein sending the message to the destination process comprises sending the message via an application programming interface between the first process and the second process;

determining whether the message requires the destination process to send a second message to at least one other process, wherein the at least one other process is associated with at least one other set of processes;

in response to determining that the message requires the destination process to send the second message to the at least one other process, determining whether the at least one security policy permits interaction between the second set of processes and the at least one other set of processes;

in response to determining that the at least one security policy and the at least one other set of processes permits interaction between the second set of processes and the at least one other set of processes, determining whether the at least one security policy permits interaction between the first set of processes and the at least one other set of processes; and in response to determining that the at least one security policy permits interaction between the first set of processes and the at least one other set of processes, sending the message to the at least one other process.

2. The method of claim 1, wherein receiving the message comprising an operation request comprises receiving the message further comprising at least one of a set data request, a get data request, and a create user input event request.

3. The method of claim 1, further comprising:

prior to determining whether the at least one security policy permits interaction between the first set of processes and second set of processes, determining whether the message is of a type which is unable to be delivered; and in response to determining that the message is of the type unable to be delivered, discarding the message.

4. The method of claim 3, wherein determining whether the message is of the type which is unable to be delivered comprises determining whether the message comprises at least one of a window creation message, an initialize dialog box message, and an edit window message.

5. The method of claim 3, further comprising:

in response to determining that the message is of the type which is unable to be delivered, sending an error message to a source process.

6. The method of claim 1, further comprising:

in response to determining that the destination process is not associated with the second set of processes, determining whether the destination process is associated with the first set of processes;

in response to determining that the destination process is associated with the first set of processes, determining whether at least one intra-set security policy permits sending the message; and in response to determining whether the at least one intra-set security policy permits sending the message, sending the message.

7. The method of claim 1, wherein determining whether the at least one security policy permits interaction between the first set of processes and second set of processes comprises:

determining whether the at least one security policy is associated with the first set of processes and second set of processes; and determining whether the at least one security policy associated with the first set of processes and second set of processes has been configured by at least one of an operating system, an administrator, and a user.

8. The method of claim 1, wherein receiving the message from the first process associated with the first set of processes comprises receiving the message from the first process associated with the first set of processes that is associated with a plurality of processes.

9. The method of claim 1, wherein receiving the message from the first process associated with the first set of processes comprises receiving the message from the first process associated with the first set of processes comprising at least one of a game application, a financial application, a document processing application, a personal information management application, an interne access application, and an operating system process.

10. A computer-readable storage device which stores a set of instructions which when executed performs a method for providing inter-process message security, the method executed by the set of instructions comprising:

receiving a message from a first process associated with a first set of processes governed by a first set of security policies, the message comprising a request to perform an operation by a destination application;

determining a destination process for the message;

determining whether the destination process is associated with a second set of processes governed by a second set of security policies;

in response to determining that the destination process is associated with the second set of processes, determining whether at least one security policy permits interaction between the first set of processes and the second set of processes;

in response to determining that the at least one security policy permits interaction between the first set of processes and the second set of processes, sending the message to the destination process, wherein sending the message to the destination process comprises sending the message via an application programming interface between the first process and the second process;

determining whether the message requires the destination process to send a second message to at least one other process, wherein the at least one other process is associated with at least one other set of processes governed by at least one other set of security policies;

in response to determining that the message requires the destination process to send the second message to the at least one other process, determining whether the at least one security policy permits interaction between the second set of processes and the at least one other set of processes;

in response to determining that the at least one security policy and the at least one other set of processes permits interaction between the second set of processes and the at least one other set of processes, determining whether the at least one security policy permits interaction between the first set of processes and the at least one other set of processes; and in response to determining that the at least one security policy permits interaction between the first set of processes and the at least one other set of processes, sending the message to the at least one other process.

11. The computer-readable storage device of claim 10, wherein the set of instructions further comprises:

determining that the at least one security policy is not associated with the first set of processes and second set of processes; and in response to determining that the at least one security policy is not associated with the first set of processes and second set of processes, requesting authorization to deliver the message.

12. The computer-readable storage device of claim 10, wherein the set of instructions further comprises returning a value to the first process.

13. The computer-readable device of claim 10, wherein the set of instructions further comprises:
   determining whether the at least one security policy is associated with the first set of processes and second set of processes;
   prior to determining whether the at least one security policy is associated with the first set of processes and second set of processes, determining whether the message is of a type which is unable to be delivered; and
   in response to determining that the message is of the type unable to be delivered, discarding the message.

14. The computer-readable device of claim 13, wherein the set of instructions further comprises returning an error to the first process.

15. The computer-readable device of claim 10, wherein the first process and the destination process are associated with a unique set of processes governed by a set of security policies.

16. The computer-readable device of claim 10, wherein the set of instructions further comprises:
   prior to determining whether the destination process is associated with the second set of process, determining whether the destination process is the same as the first process; and
   sending the message to the destination process.

17. A system for providing inter-process message security, the system comprising:
   a hardware processing unit; and
   a hardware memory storage coupled to the hardware processing unit, the hardware memory storage storing instructions that, when executed by the hardware processing unit, cause the hardware processing unit to:
   receive a message from a first process associated with a first set of processes governed by a first set of security policies, the message comprising a request to perform an operation by a destination application;
   determine a destination process for the message;
   determine whether the destination process is associated with a second set of processes governed by a second set of security policies;
   in response to determining that the destination process is associated with the second set of processes, determine whether at least one security policy permits interaction between the first set of processes and the second set of processes;
   in response to determining that the at least one security policy permits interaction between the first set of processes and the second set of processes, send the message to the destination process, wherein sending the message to the destination process comprises sending the message via an application programming interface between the first process and the second process;
   determine whether the message requires the destination process to send a second message to at least one other process, wherein the at least one other process is associated with at least one other set of processes governed by at least one other set of security policies;
   in response to determining that the message requires the destination process to send the second message to the at least one other process, determine whether the at least one security policy permits interaction between the second set of processes and the at least one other set of processes;
   in response to determining that the at least one security policy and the at least one other set of processes permits interaction between the second set of processes and the at least one other set of processes, determine whether the at least one security policy permits interaction between the first set of processes and the at least one other set of processes; and
   in response to determining that the at least one security policy permits interaction between the first set of processes and the at least one other set of processes, send the message to the at least one other process.

18. The system of claim 17, wherein the instructions further cause the hardware processing unit to:
   determine that the at least one security policy is not associated with the first set of processes and second set of processes; and
   in response to determining that the at least one security policy is not associated with the first set of processes and second set of processes, request authorization to deliver the message.

19. The system of claim 17, wherein the instructions further cause the hardware processing unit to return a value to the first process.

20. The system of claim 17, wherein the instructions further cause the hardware processing unit to:
   determine whether the at least one security policy is associated with the first set of processes and second set of processes;
   prior to determining whether the at least one security policy is associated with the first set of processes and second set of processes, determine whether the message is of a type which is unable to be delivered; and
   in response to determining that the message is of the type unable to be delivered, discard the message.

* * * * *